United States Patent [19]

Lange et al.

[11] 3,989,650

[45] Nov. 2, 1976

[54] PROCESS FOR THE PRODUCTION OF ANION EXCHANGERS - AMIDOALKYLATION OF CROSSLINKED WATER INSOLUBLE AROMATIC-GROUP CONTAINING POLYMERS USING ESTERS OF CYCLIC N-HYDROXYALKYLIMIDES

[75] Inventors: Michael Lange; Günter Naumann, both of Leverkusen, Germany

[73] Assignee: Bayer Aktiengesellschaft, Germany

[22] Filed: Apr. 16, 1975

[21] Appl. No.: 568,604

[30] Foreign Application Priority Data

Apr. 19, 1974 Germany............................ 2418976

[52] U.S. Cl. .............................. 260/2.1 E; 131/202; 526/50
[51] Int. Cl.² .......................................... C08F 8/02
[58] Field of Search ...................... 260/2.1 E, 2.1 C; 131/202

[56] References Cited
UNITED STATES PATENTS 3,791,996   2/1974   Wuchter........................... 260/2.1 E
3,925,264   12/1975  Corte et al. ...................... 260/2.1 E

FOREIGN PATENTS OR APPLICATIONS 1,023,918   3/1966   United Kingdom

*Primary Examiner*—Joseph L. Schofer
*Assistant Examiner*—Peter F. Kulkosky
*Attorney, Agent, or Firm*—Connolly and Hutz

[57] ABSTRACT

This invention relates to a new process for the production of crosslinked, water-insoluble synthetic resins with anion exchanger properties wherein the crosslinked, water-insoluble organic polymers containing aromatic nuclei are reacted, in the presence of swelling agents for the polymer and in the presence of acid catalysts, with esters of N-hydroxyalkylamides or N-hydroxyalkylimides, and the acylamido alkylated reaction product is subsequently hydrolysed in known manner. The invention furthermore concerns new crosslinked water-insoluble synthetic resins with anion exchanger properties containing at least two aminoalkyl groups per aromatic nucleus.

2 Claims, No Drawings

PROCESS FOR THE PRODUCTION OF ANION EXCHANGERS - AMIDOALKYLATION OF CROSSLINKED WATER INSOLUBLE AROMATIC-GROUP CONTAINING POLYMERS USING ESTERS OF CYCLIC N-HYDROXYALKYLIMIDES

This invention relates to a new process for the production of crosslinked, water-insoluble synthetic resins with anion exchanger properties by introducing aminoalkyl groups into crosslinked, water-insoluble organic polymers containing aromatic nuclei, distinguished by the fact that the crosslinked, water-insoluble organic polymers containing aromatic nuclei are reacted, in the presence of swelling agents for the polymer and in the presence of acid catalysts, with esters of N-hydroxyalkylamides or N-hydroxyalkylimides, and the acylamido alkylated reaction product is subsequently hydrolysed in known manner.

The esters used in accordance with the invention are, above all, the esters of N-hydroxyalkylamides and N-hydroxyalkylamides with lower aliphatic or aromatic mono- or dicarboxylic acids, such as formic acid, butyric acid, valeric, succinic, maleic, benzoic and phthalic acid or, preferably, $C_2$— or $C_3$—alkane carboxylic acids, such as acetic acid and propionic acid, or inorganic oxygen-containing acids, such as sulphuric acid and phosphoric acid or acid esters thereof.

As N-hydroxy alkyl amides and N-hydroxyl alkyl imides to be used there should be mentioned besides the N-hydroxy ethyl amides and N-hydroxy ethyl imides, above all, the N-hydroxy methyl amides of $C_1$—$C_5$—alkane carboxylic acids such as formic acid, acetic acid, propionic acid, butyric acid, valeric acid, and the hydroxy methyl imides of saturated or unsaturated aliphatic $C_4$-$C_6$ dicarboxylic acids, such as succinic acid, glutaric acid, adipic acid, diglycolic acid, maleic acid or aromatic o-dicarboxylic acids such as phthalic acid.

The crosslinked, water-insoluble organic polymers containing aromatic nuclei are preferably aromatic vinyl compounds of the type obtained by the copolymerisation of monovinyl and polyvinyl compounds. Copolymers of this kind are know per se and are obtained by known methods. The copolymers may be both microporous, i.e. have a gel structure, or macroporous.

It is preferred to use copolymers of the kind consisting predominently of aromatic monovinyl compounds and to a far lesser extent of aromatic or aliphtic polyvinyl compounds. The proportion of polyvinyl compounds acting as crosslinking agents may vary within wide limits. In the case of copolymers of gel structure, the polyvinyl compounds are generally used in quantities of from 0.5 to 20% by weight and preferably in quantities of from 0.5 to 10% by weight, whereas in the case of macroporous copolymers the polyvinyl compounds are generally used in quantities of from 2 to 50% and preferably in quantities of from 2 to 20%.

The following are mentioned as examples of aromatic monovinyl compounds: vinyl naphthalene, substituted styrenes, such as vinyl toluene, vinyl anisol, ethyl styrene and, in particular, styrene.

The following are mentioned as examples of polyvinyl compounds: divinyl pyridine, divinyl toluenes, divinyl naphthalenes, diallyl phthalate, ethylene glycol diacrylate, divinyl xylene, divinyl ethyl benzene, divinyl sulphone, polyvinyl or polyallyl ethers of glycol, glycerol and pentaerythritol, divinyl ketone, divinyl sulphide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylene diacrylamide, N,N'-methylene dimethacrylamide, N,N'-ethylene diacrylamide, 1,2-di-(α-methyl methylene sulphonamide)-ethylene, trivinyl benzene, trivinyl naphthalene, polyvinyl anthracenes and, in particular, divinyl benzene, trivinyl cyclohexane and ethylene glycol dimethyacrylate.

It is also possible the use crosslinked aromatic vinyl copolymers prepared with additions of other vinyl compounds such as, for example, methyacrylic and acrylic compounds, especially acrylonitrile, ethylene, propylene, isobutylene, vinyl chloride, vinylacetate, vinylidene chloride, vinyl pyridine and substituted vinyl pyridines, and also vinyl quinolines and vinyl pyrrolidone. Other suitable additives include polyethylenically unsaturated compounds such as isoprene, butadiene, chloroprene, piperylene, pentadiene, hexadiene, octadiene, decadiene, hexatriene, cyclopentadiene and substitution products thereof, for example chloroprene, 2,3-dimethyl butadiene, 2,5-dimethyl hexadiene and 2,5-dimethyl octadiene, which generally behave as if they had only one double bond. The additives may be used in any quantities. However, copolymers containing the above-mentioned additives in a quantity or more than 10% (bases on the total weight of the monomers) are of little interest so far as the production of anion-exchanging synthetic resins are concerned, because synthetic resins with a relatively low ion-exchange capacity would be obtained in their case.

Suitable swelling agents for the polymer are, above all, halogenated hydrocarbons such as dichloromethane, carbon tetrachloride, dichloroethane, trichlorethylene, symmetrical tetrachlorethane, 1,1,2-trichlorethane, tetrachlorethylene, dichloropropane, pentachlorethane, trichloropropanes, tetrachloropropanes and also polar organic solvents such as dimethyl formamide, dimethyl sulphoxide and sulpholan, aliphatic or aromatic hydrocarbons substituted by nitro groups such as 1-nitropropane, 2-nitropropane, nitroethane or nitrobenzene. The above-mentioned swelling agents may be used either individually or in admixture with one another.

The halogen-free swelling agents, such as nitrobenzene, nitroethane, nitropropane, dimethyl sulphoxide or sulpholan, are used with advantage when the anion-exchangers to be produced must not give off any halogens, for example chlorine, as is required, for example, in the case of anion exchangers intended for use in nuclear power stations.

Suitable acid catalysts include Friedel-Crafts catalysts such as zinc chloride, aluminium chloride, tin tetrachloride, iron (III) chloride and above all, strong organic acids, for example aliphatic and aromatic sulphonic acids such as methane, benzene and toluene sulphonic acid, and strong inorganic acids, expecially oxygen-containing acids such as phosphoric acid and its acid esters, and above all sulphuric acid (concentrated or fuming). Mixtures of inorganic oxygen-containing acids, such as sulphuric acid, and lower aliphatic carboxylic acids or their anhydrides, for example acetic acid or acetic acid anhydride, have also proved to be effective.

The reaction according to the invention of the organic polymers with the esters of N-hydroxy alkyl amides or N-hydroxy alkyl imides is generally carried out at temperatures in the range from 0° to 150° C and preferably at temperatures in the range of from 30 to 100° C.

The esters are used with advantage in such quantities that there are from 0.5 to 4 mols and preferably from 1 to 2.5 mols of ester to 1 mol of aromatic unit, i.e. per mol of aromatic nuclei, in the polymer.

The quantities of acid catalysts may vary within wide limits. In general, it has proved to be advantageous to use the acid catalysts in quantities of from 0.1 to 1.5 mols and preferably in quantities of from 0.75 to 1.25 mols per mol of ester.

The reaction is advantageously carried out by initially preparing the esters of the N-hydroxy alkyl amides or imides, the swelling agents used optionally serving simultaneously as solvents for the esterification reaction, and swelling the polymers in these solutions of the esters. The reaction between the esters and the polymer takes place after the acid catalysts have been added and the requisite reaction temperature adjusted.

On completion of the acylaminoalkylation reaction, the acyl radical is split off from the reaction products in known manner, for example by subjecting the acylamino alkylation products to alkaline or acid hydrolysis, or by reaction with hydrazine followed by acid hydrolysis, optionally in the presence of organic solvents or swelling agents. For hydrolysis, the acylamino alkylation product is advantageously separated off from the reaction medium, for example by filtration under suction. The isolated product may optionally be dried or washed with an organic water-miscible solvent, for example methanol, ethanol, dioxan or tetrahydrofuran. The product separated off is then hydrolysed in an autoclave at temperatures of between 100° and 250° C with approximately 5 to 40% strength by weight of an aqueous or alcoholic solution of an alkali, such as sodium hydroxide or potassium hydroxide, or with an approximately 5 to 80% strength by weight aqueous solution of a mineral acid or sulphuric acid. On the other hand, the acylamino alkylation product may also be reacted with a 5 to 50% strength by weight aqueous or alcoholic solution of hydrazine hydrate at temperatures in the range of from 50° to 100° C. In one preferred embodiment, this particular solution may contain other alkalis, especially caustic alkalis, in quantities of from 1 to 20% by weight. The reaction product may be isolated, washed with water and subsequently heated with an aqueous solution of mineral acid (5 to 20% strength in order to complete hydrolysis.

The aminoalkyl compounds prepared in accordance with the invention may be further modified in known manner by alkylation using known alkylating agents such as alkyl halides, for example methyl, ethyl, propyl chloride or bromide, dialkyl sulphates, for example dimethyl sulphate, alkylene oxides, for example ethylene or propylene oxide, halogen hydrins, polyhalogen compounds epihalohydrins, ethylene imines or formaldehyde-formic acid mixtures.

It is possible by virtue of the process according to the invention to produce water-insoluble anion-exchanging synthetic resins containing aminoalkyl groups with a high, hitherto unattained anion-exchange capacity coupled with high grain stability, in a technically simple and safe manner.

The present invention furthermore concerns new aminoalkyl group containing water-insoluble synthetic resins with anion exchanger properties; these resins are characterised by containing at least two aminoalkyl groups per aromatic nucleus.

The new aminoalkyl group containing water-insoluble synthetic resins with anion exchanger properties are preferably at least two aminoalkyl groups, especially aminomethyl groups, per aromatic nucleus containing microporous (gel-type) copolymers of aromatic monovinyl compounds and 0.5 to 7% by weight based on the weight of the copolymer, of polyvinyl compounds and macroporous at least two aminoalkyl groups, especially aminomethyl groups, per aromatic nucleus containing copolymers of aromatic monovinyl compounds and 2 to 10% by weight based on the weight of the copolymer of polyvinyl compounds, the porosity of said copolymers resulting from polymerisation in the presence of 40 to 100% by weight based on the weight of the monomers of an inert organic liquid. (Inert organic liquid = organic liquid which is a solvent for the monomers but a nonsolvent for the polymers).

The new aminoalkyl group containing water-insoluble synthetic resins with anion exchanger properties are besides for other uses excellent suitable as filter materials in filters of cigarettes.

Various processes for the production of water-insoluble anion-exchanging synthetic resins containing aminoalkyl groups have been proposed.

The advantage of the process according to the invention over the aminoalkylation processes known from German Patent Specification Nos. 829,223; 841,796 and 848,257, and from German Offenlegungsschrifts Nos. 2,161,628; 2,211,134 and 2,248,528, is that a much higher substitution of the polymer and, hence, a much higher anion-exchange capacity is obtained by the process according to the invention. In addition, the process according to the invention affords the commercially significant advantage, in cases where strong acids, especially sulphuric acid, are used as the acid catalysts, that the formation of monochloromethyl and-/or bisdichloromethyl ethers is avoided. The use and formation of these highly toxic compounds in the processes described in German Patent Specifications Nos. 829,223; 841,796 and 848,257, and in German Offenlegungsschrift Nos. 2,211,134, is a serious disadvantage of those processes.

It should also be emphasised that the resin grains of microporous polymers remain intact during acylamino alkylation by the process according to the invention, whereas a large proportion of the grains split open during acylamino alkylation by the process described in German Offenlegungsschrift No. 2,161,628.

EXAMPLE 1

700 g of N-hydroxymethyl phthalimide, dissolved in 2400 g of dichlorethane, are heated for 5 hours to reflux temperatures with 454 g of acetic acid anhydride. 300 g of a styrene polymer crosslinked with 6% of divinyl benzene are swollen in this ester solution over a period of 30 minutes at 60° C. 400 g of concentrated sulphuric acid are then added dropwise over a period of 4 hours at reflux temperature. After stirring for 20 hours at the same temperature, the polymer is filtered off under suction and suspended in 2000 ml of 10% aqueous ammonia solution. The residues of swelling agent are removed from the suspension by azeotropic distillation. The polymer is then heated for 10 hours to 180° C with 40% sodium hydroxide solution in an autoclave. After the sodium hydroxide has been washed out, 750 ml of a weakly basic anion exchanger are obtained with an acid binding capacity of 3.3 Val/l for N/10 hydrochloric acid and a nitrogen content of 9.55% in the dry material.

EXAMPLE 2

354 g of N-hydroxymethyl phthalimide, dissolved in 1100 g of dichlorethane, are heated for 5 hours to reflux temperature with 227 g of acetic acid anhydride. 150 g of a styrene polymer crosslinked with 4% of divinyl benzene are swollen in this ester solution over a period of 30 minutes at 60° C. 240 g of concentrated sulphuric acid are then added dropwise over a period of 1 hour at reflux temperature, and the reaction mixture is stirred at the same temperature for a period of 20 hours. After the reaction product has been separated off, it is suspended in 1000 ml of 10% aqueous ammonia solution. The residues of dichlorethane are removed from this suspension by azeotropic distillation. The reaction product is then separated off and hydrolysed by heating for 10 hours to 180° C with 40% sodium hydroxide solution in an autoclave. After the sodium hydroxide has been washed out, a weakly basic anion exchanger is obtained with an acid-binding capacity of 3.0 Val/l for N/10 hydrochloric acid and a nitrogen content of 10.4% in the dry material.

By using instead of 240 g of concentrated sulphuric acid 420 g of p-toluene sulphonic acid as catalyst, practically the same result was achieved.

EXAMPLE 3

160 g of a styrene polymer crosslinked with 2% of divinyl benzene are reacted, followed by hydrolysis, in the same way as described in Example 1. A weakly basic anion exchanger with an acid-binding capacity of 2.87 Val/l for N/10 hydrochloric acid and a nitrogen content of 18.2% in the dry material is obtained.

EXAMPLE 4

245 g of an ester, obtained by reacting N-hydroxymethyl phthalimide and acetic acid anhydride, are dissolved in 600 ml of 2-nitropropane, 100 g of a styrene bead polymer crosslinked with 6% of divinyl benzene are swollen in this solution over a period of 30 minutes. The mixture is then heated to 85° C, followed by the dropwise addition with stirring of 125 g of concentrated sulphuric acid. The reaction mixture is then kept at the same temperature for another 16 hours. The reaction product is then separated off and suspended in aqueous ammonia solution. The suspension is freed from residues of the swelling agent by azeotropic distillation. The reaction product is separated off and hydrolysed in an autoclave with 40% sodium hydroxide solution at a temperature above 180° C. A weakly basic anion exchanger is obtained which, after the sodium hydroxide has been washed out, has an acid-binding capacity for N/10 hydrochloric acid of 3.3 Val/l and a nitrogen content of 9.45% in the dry material.

EXAMPLE 5

354 g of N-hydroxymethyl phthalimide, dissolved in 1200 g of dichlorethane, are heated for 5 hours to reflux temperature with 227 g of acetic acid anhydride. After cooling to 60° C, 150 g of a macroporous styrene polymer crosslinked with 8% of divinyl benzene (obtained by the bead polymerisation of styrene and divinyl benzene in the presence of 60% by weight of isododecane, based on the sum total of monomers) are swollen in this solution over a period of 30 minutes. The mixture is then heated to reflux temperature, followed by the dropwise addition with stirring over a period of 4 hours of 240 g of concentrated sulphuric acid. After stirring for another 20 hours at the same temperature, the reaction product is separated off and freed from the dichlorethane adhering to it by suspension in aqueous ammonia solution, followed by azeotropic distillation, in the same way as described in Example 1. The polymer is then heated for 10 hours to 180° C with 40% sodium hydroxide solution in an autoclave. After the sodium hydroxide has been washed out, 540 ml of a weakly basic anion exchanger are obtained with an acid-binding capacaty for N/10 hydrochloric acid of 2.4 Val/l and a nitrogen content of 10.6% in the dry material.

EXAMPLE 6

250 g of an ester, obtained by reacting (5-hours heating to reflux temperature) bis-(phthalimido-methyl)-ether and acetic acid anhydride, are dissolved in 500 ml of 2-nitropropane. 100 g of a macroporous styrene bead polymer crosslinked with 6% of divinyl benzene (obtained by the bead polymerisation of styrene and divinyl benzene in the presence of 70% by weight of isododecane, based on the monomer total) are swollen in this solution over a period of 30 minutes. The reaction mixture is heated to 85° C, followed by the dropwise addition with stirring of 125 g of concentrated sulphuric acid. After stirring for 16 hours at the same temperature, the resin is separated off and heated to 100° C in aqueous ammonia solution. The polymer is then separated off and hydrolysed in an autoclave by treatment for 10 hours with 40% sodium hydroxide solution at a temperature of 180° C. After the sodium hydroxide has been washed out, 340 ml of a weakly basic anion exchanger are obtained with an acid-binding capacity for N/10 hydrochloric acid of 2.3 Val/l and a nitrogen content of 10.85% in the dry material.

By using instead of 125 g of concentrated sulphuric acid, 130 g of water-free phosphoric acid as catalyst the same result was achieved.

EXAMPLE 7

600 g of the ester prepared from N-hydroxymethyl phthalimide and acetic acid anhydride are dissolved in 2000 ml of dichlorethane. 230 g of a macroporous styrene bead polymer crosslinked with 5% of divinyl benzene (obtained by the bead polymerisation of styrene and divinyl benzene in the presence of 63% by weight of isododecance, based on the total weight of the monomers) are swollen in this solution over a period of 30 minutes at 60° C. The mixture is then heated to reflux temperature, followed by the addition with stirring over a period of 3 hours of 320 g of concentrated sulphuric acid. After stirring for 20 hours at reflux temperature, the reaction product is separated off and freed from the swelling agent adhering to it by suspension in aqueous ammonia solution, followed by removal of the dichlorethane from the aqueous solution by distillation. The reaction product is separated off and subsequently hydrolysed in an autoclave by treatment with 40% sodium hydroxide solution for 10 hours at 180° C. After the alkali has been washed out, the yield amounts to 1000 ml. The dry material has a nitrogen content of 12.5%.

920 ml of the polymer containing aminomethyl groups thus obtained are suspended in 2 litres of water, followed by the addition at 45° C first of 100 g of concentrated sulphuric acid and then of 715 ml of 37% aqueous formaldehyde solution and 410 ml of formic acid. The reaction mixture is then slowly heated to 95° C and kept at that temperature until the evolution of gas is over (approximately 16 hours). The anion exchanger which now contains dimethyl aminomethyl groups is separated off, made alkaline with dilute sodium hydroxide and subsequently washed until neutral. The yield comprises 1100 ml.

The anion exchanger containing tertiary amino groups thus obtained has an acid-binding capacity for N/10 hydrochloric acid of 1.9 Val/1. The useful volume capacity (UVC) in a filter tube in the absence of carbon dioxide amounts to 27 g of CaO/1 for a specific load of 30. In the presence of carbon dioxide, the UVC amounts to 42.0 g of CaO/1 for a specific load of 10.

EXAMPLE 8

354 g of N-hydroxymethyl phthalimide, dissolved in 1200 g of dichlorethane, are heated for 4 hours to reflux temperature with 204 g of acetic acid anhydride. 208 g of a styrene bead polymer crosslinked with 4% of divinyl benzene are swollen in this ester solution over a period of 1 hour at 60° C. The mixture is then heated to reflux temperature, followed by the addition with stirring over a period of 1 hour of 196 g of sulphuric acid (monohydrate). After stirring for 18 hours at reflux temperature, the reaction mixture is cooled. The polymer is separated off and heated with 1000 ml of 10% aqueous ammonia solution until the dichlorethane has been completely removed by azeotropic distillation. The polymer is then hydrolysed in an autoclave by treatment with 30% sodium hydroxide for 10 hours at 180° C. After the sodium hydroxide has been washed out, 475 ml of a weakly basic anion exchanger are obtained with a nitrogen content of 9.3% in the dry material and an acid binding capacity for N/10 hydrochloric acid of 3 Val/1.

For conversion into a strongly basic anion exchanger, the resin is suspended in 1300 g of 15% aqueous sodium hydroxide solution and the resulting suspension is treated with stirring over a period of 16 hours at 40° C with 410 g of methyl chloride in an autoclave under a pressure of at least 1 atmosphere. After the reaction product has been separated off from the reaction liquid and the OH-form has been converted into the chloride form with excess hydrochloric acid, followed by washing out with water, 1230 ml of a strongly basic anion exchanger in the chloride form are obtained with a total capacity of 1.3 Val/1 of resin in the chloride form.

By using instead of 196 g of sulphuric acid monohydrate 325 g of iron III chloride (water-free) as catalyst practically the same result was achieved.

EXAMPLE 9

531 g of N-hydroxymethyl phthalimide, dissolved in 1760 g of dichlorethane, are heated for 4 hours to reflux temperature with 306 g of acetic acid anhydride. The ester solution is reacted with 208 g of a styrene bead polymer crosslinked with 4% of divinyl benzene and further processed in the same way as described in Example 8. 700 ml of a weakly basic anion exchanger are obtained with a nitrogen content of 11% in the dry material and an acid-binding capacity for N/10 hydrochloric acid of 3.3 Val/1. After the primary amine has been quaternised with methyl chloride, in the same way as described in Example 8, 1260 ml of a strongly basic anion exchanger in the chloride form are obtained with a total capacity of 1.58 Val/1 of resin in the chloride form.

EXAMPLE 10

354 g of N-hydroxy methyl phthalimide, dissolved in 1200 g of dichlorethane, are heated for 4 hours to reflux temperature with 260 g of propionic acid anhydride. The solution of the resulting propionic acid ester of the N-hydroxymethyl phthalimide is reacted with 208 g of a styrene bead polymer crosslinked with 4% of divinyl benzene, followed by further processing, in the same way as described in Example 8. 480 ml of a weakly basic anion exchanger are obtained with a nitrogen content of 8% in the dry material and an acid-binding capacity for N/10 hydrochloric acid of 2.7 Val/1.

EXAMPLE 11

The reaction is carries out in the same way as described in Example 10, except that 316.4 g of butyric acid anhydride are used for esterification instead of the propionic acid anhydride. 500 ml of a weakly basic anion exchanger are obtained with a nitrogen content of 7.6% in the dry material and an acid-binding capacity for N/10 hydrochloric acid of 2.35 Val/1.

EXAMPLE 12

354 g of N-hydroxy methyl phthalimide dissolved in 1200 g of dichlorethane are heated for 15 hours to reflux temperature with 9 g of concentrated sulphuric acid to form bis-phthalimido methyl ether. This ether is heated for 5 hours to reflux temperature with 100 g of succinic acid anhydride to form succinic acid bis-(N-phthaloylamino)-methyl ester which cristallises from the reaction mixture on cooling.

436 g of the succinic acid ester prepared in this manner are dissolved in 1200 g of dichloroethane. 160 g of a macroporous styrene bead polymer crosslinked with 8% of divinyl benzene (obtained by bead polymerisation of styrene and divinyl benzene in the presence of 60% by weight of isododecane based on the sum total of monomers) are swollen in this solution over a period of 30 minutes at 60° C, 100 g of concentrated sulphuric acid are then added dropwise with stirring over a period of 3 hours. After stirring the reaction mixture for 20 hours at reflux temperature, the reaction product is separated off. The product is freed form adherent dichloroethane by suspending it in 10% aqueous ammonia solution and azeotropic destillation as is described in Example 1. The polymer is then heated for 10 hours to 180° C with 40% sodium hydroxide solution in an autoclave. After the sodium hydroxide has been washed out, 585 ml of a weakly basic anion exchanger are obtained with an acid binding capacity of 2,72 Val/1 for N/10 hydrochloric acid and a nitrogen content of 10,9% in the dry material.

EXAMPLE 13

600 g of the ester prepared form N-hydroxymethyl phthalimide and acetic acid anhydride are reacted under the conditions applied in Example 7 with 100 g of the macroporous styrene bead polymer crosslinked with 5% of divinyl benzene described in Example 7.

After the alcaline hydrolysis of the reaction product there is obtained a weakly basic anion exchanger with an acid binding capacity for N/10 hydrochloric acid of 2,85 Val/l and a nitrogen content of 15,3% in the dry material.

EXAMPLE 14

600 g of the ester prepared from bis-(phthalimidomethyl)-ether and acetic acid anhydride are reacted under the conditions applied in Example 7 with 100 g of a macroporous styrene bead polymer crosslinked with 3% of divinyl benzene (obtained by the bead polymerisation of styrene and divinyl benzene in the presence of 80% by weight of isododecane, based on the monomer total.

After the alcaline hydrolysis of the reaction product there is obtained a weakly basic anion exchanger with a acid binding capacity for N/10 hydrochloric acid of 2,6 Val/l and a nitrogen content of 17,2% in the dry material.

We claim:

1. In the process for producing a water-insoluble synthetic resin with anion exchange properties by introducing aminoalkyl groups into a crosslinked, water-insoluble organic polymer containing aromatic nuclei wherein said organic polymer is reacted in the presence of a swelling agent for the polymer and in the presence of an acid catalyst with an amidoalkylating agent and the amidoalkylated reaction product is subsequently hydrolyzed, the improvement comprising using as amidoalkylating agent, an ester of a cyclic N-hydroxyalkylimide of an aliphatic or aromatic dicarboxylic acid, the esterifying acid of said ester being a lower aliphatic or aromatic monocarboxylic or dicarboxylic acid or an inorganic oxygen-containing acid and the molar ratio of ester to aromatic nuclei in the crosslinked polymer being from 0.5:1 to 4:1.

2. The process according to claim 1 wherein an ester of a cyclic N-hydroxyalkylimide of a saturated or unsaturated aliphatic $C_4$–$C_6$ dicarboxylic acid or aromatic o-dicarboxylic acid is used.

* * * * *